INVENTOR
ROY W. FORSBERG
BY Lindsey, Prutzman and Hayes
ATTORNEYS

United States Patent Office 3,497,995
Patented Mar. 3, 1970

3,497,995
HEIGHT SENSITIVE PROXIMITY DOOR OPERATOR SYSTEM
Roy W. Forsberg, Southington, Conn., assignor to The Stanley Works, New Britain, Conn., a corporation of Connecticut
Filed Apr. 19, 1968, Ser. No. 722,599
Int. Cl. E05f 15/20, 15/12
U.S. Cl. 49—25                                         12 Claims

ABSTRACT OF THE DISCLOSURE

An unobtrusive approach or height sensitive proximity door operator system in which an electrically isolated oscillator driven transmitter plate antenna on the floor adjacent the door opening cooperates with an electrically isolated receiver antenna mounted by a grounded header above the doorway. The presence of a conductive object, such as a person, increases the capacitive coupling between the transmitter plate and receiver antennas to produce an increase in the receiver antenna output which, in practice, is essentially proportional to the height of the object. This signal is amplified and is fed, along with the oscillator signal, to a synchronous detector whose output charges an integrating capacitor. When the capacitor charge reaches a sufficient level, a relay switch is closed to actuate the door operator mechanism. The transmitter plate and receiver antennas are sized to provide a preselected range of sensitivity above the transmitter plate antenna.

SUMMARY OF THE INVENTION

This invention relates in general to an automatic door operator, and more particularly to a height sensitive proximity controller for a door operator having spaced transmitter and receiver antennas vertically spanning the door opening and employing synchronous detection techniques to preclude false actuation by spurious signals.

In a preferred embodiment, an LC oscillator supplies a signal in the 10 kilocycle range to a driver amplifier and to one input of a synchronous detector. The amplifier output is coupled to an electrically isolated transmitter plate or antenna buried just beneath the surface of the floor adjacent to and symmetrically centered along the longitudinal axis of the traffic flow through the door opening. The alternating field set up by the transmitter plate is sensed by an electrically isolated receiver antenna mounted by a grounded header above the doorway. This relatively weak signal is fed to a receiver amplifier, located in close proximity to the receiver antenna to minimize any line losses, whose output is coupled to the other input of the synchronous detector. Under normal conditions, with no person or other conductive object standing or passing over the transmitter plate, the circuit is adjusted so that the detector output, as reflected across an integrating or charging capacitor, is not sufficient to actuate a transistorized relay driver. When a person or object of a predetermined height enters the field, however, and increases the capacitive coupling between the antenna plates, the receiver output increases and charges the capacitor to a sufficient level to actuate the relay driver and close its associated switch contacts. The latter complete the circuit to the door operator mechanism to effect the desired proximity control opening.

Among the many advantages afforded by this invention are the following:

(a) There is no unsightly or obtrusive exposure of the transmitter antenna which may be completely buried and hidden from view.

(b) The transmitter installation is much safer and reliable than the more common prior art door operator arrangements employing foot treadles, floor mats, electric eye posts, etc., to trip over or become damaged by traffic through the doorway.

(c) The triggering threshold of the circuit may be easily adjusted to preclude actuation by small animals while at the same time being responsive to the presence of children.

(d) The power supply, oscillator, plate driver, synchronous detector and relay driver components may be carried in a single control box remotely located from the door itself.

(e) A plurality of the above components may be located in the same control box for controlling a plurality of differently located door openings with different oscillator frequencies being employed to avoid interference problems.

(f) A single transmitter plate may be used for initiating the independent operation of both the inner and outer doors of an entrance foyer, for example, by driving the plate at two different frequencies, one for each door.

(g) A plurality of independent transmitter plates may be positioned in tandem along the traffic path and driven at different frequencies to initiate the earlier operation of a door without a significant sacrifice of height sensitivity of the system.

(h) A pair of independent transmitter plates may be positioned side-by-side and driven at different frequencies to operate a pair of side-by-side doors, and automatically regulate ingress and egress of traffic in parallel paths.

The foregoing and other objects, features and advantages of the invention will be apparent from the following more particular description of the invention, as illustrated in the accompanying drawings.

DETAILED DESCRIPTION

Figure 1:
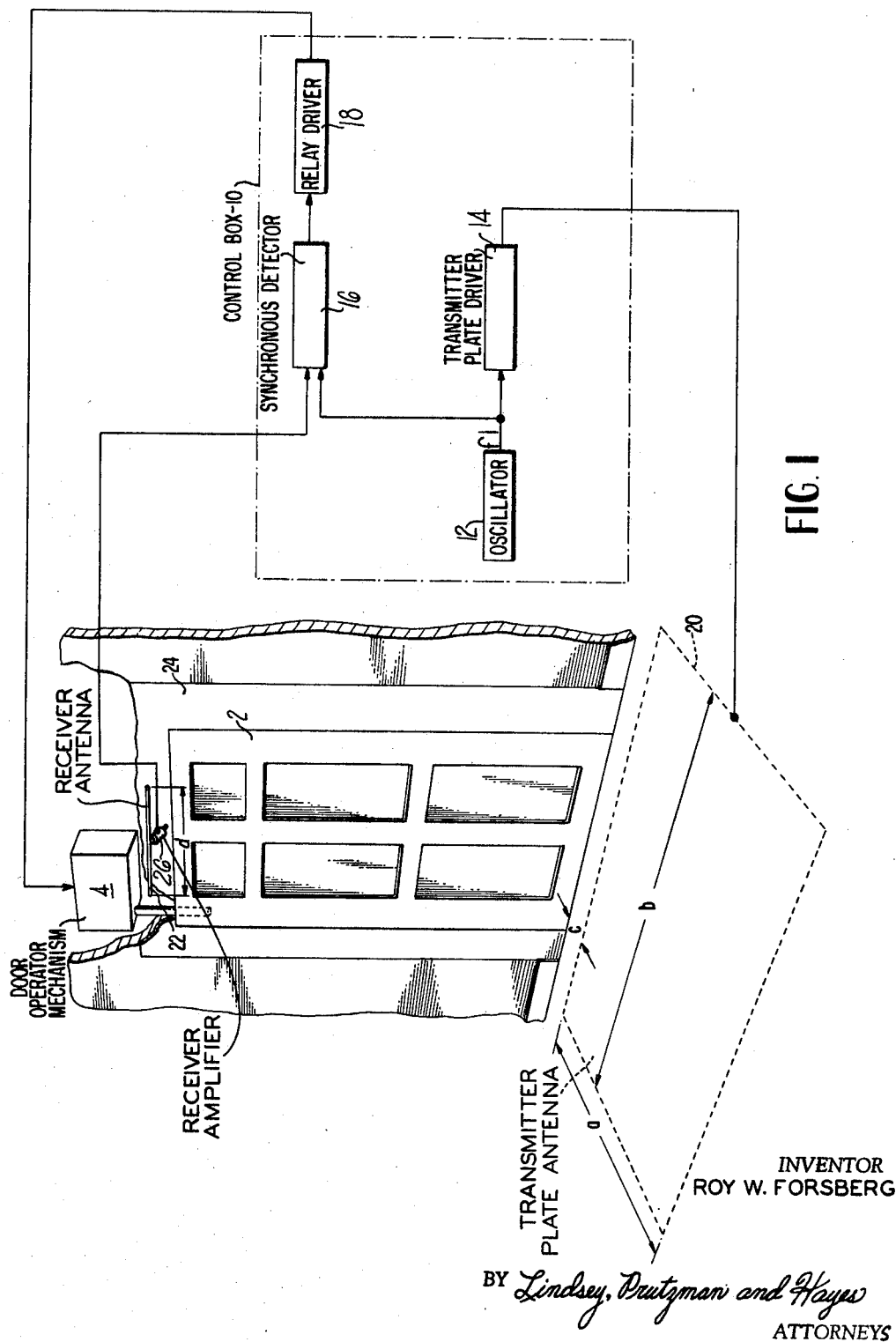
FIG. 1 shows a perspective view partly in section, of an illustrative door operator system embodying the teachings of this invention, including a block diagram of the electronic components.

Referring now to the drawings, in which like numerals refer to like parts throughout the several views, there is shown in FIG. 1, an illustrative embodiment of a power operated door embodying the present invention. In the illustrated embodiment, a power operated door 2 (shown as being a swinging door) is provided with a power operator mechanism 4 for opening and closing the door automatically in response to the traffic therethrough. The door of FIG. 1 is provided with a transmitter plate antenna 20 at the approach to the doorway which cooperates with receiver antenna 22 mounted above the doorway to produce a signal to initiate the automatic operation of the door. It will be apparent that a second transmitter plate antenna and a second receiver antenna (not shown for simplicity of illustration) may be positioned on the other side of the door to produce a signal in response to traffic approaching from the opposite direction.

A control box 10, shown by the dotted line enclosure, is provided and may be located remotely from the doorway. The control box 10 houses an oscillator 12, a transmitter plate or antenna drive 14, a synchronous detector 16 and a relay driver 18 connected as shown. If desired, the control box 10 may house more than one independent but similar oscillators, transmitter plate drivers, synchronous detectors, and relay drivers for use with other transmitter plate and receiver antennas 20, 22 as, for example, those positioned on the opposite side of door 2 (not shown) or as hereinafter more fully described with reference to FIGS. 3, 4 and 5.

As shown, the oscillator 12 produces an output signal having a frequency $f1$ for driving a transmitter plate for actuating the automatic control system. Output frequency $f1$ is connected to a first input of synchronous detector 16 and also to the input of transmitter plate driver 14.

The transmitter plate 20 is an electrical conductor positioned in the path of the traffic approaching the doorway. It must be insulated from ground and may be covered only by a non-conductive covering. The transmitter plate 20 may be formed of a sheet metal plate encapsulated in an insulated material. In the preferred form of the invention, the plate is placed between layers of vinyl of preselected thickness, and the vinyl is heat-sealed around the edges to provide a complete hermetic seal. The form of the assembly prevents water or any other conductive object from coming in contact with the transmitter plate, and the vinyl covering provides a preselected minimum capacitance to ground. The assembly can be positioned in a recess and covered with a non-conductive filler such as epoxy-concrete, in a recess so that its upper surface is flush with the surrounding flooring, or directly on the flooring and secured to that surface with standard carpet molding. For convenience in using the transmitter plate, it should be symmetrically disposed along the center line of the traffic path approaching the doorway.

In order to provide the required sensitivity of the system at the furthest edges of the transmitter plate 20, while at the same time maintaining the level of the field at the edge of the transmitter plate 20 adjacent the doorway sufficiently low to prevent the false triggering of the system, I have found that the maximum transverse dimension $b$ of the transmitter plate should be approximately 8' while the maximum length of the transmitter plate along the traffic path should be approximately 6' when the edge of the transmitter plate is spaced from the door opening the same distance as the antenna 22, i.e., about 6".

The receiver antenna 22 must be mounted above the doorway and preferably is mounted by and insulated from the grounded header 24. The antenna is preferably centered with respect to the doorway and extends parallel thereto approximately 6" in front of the header and has a length $d$ which should approximate about 24". I have found that a longer antenna reduces sensitivity at the outer edge of the plate that is parallel to the doorway, while a shorter antenna reduces sensitivity at the two side edges perpendicular to the doorway.

Receiver antenna 22 is coupled to the amplifier 26 whose output in turn is coupled to a second input of the synchronous detector 16 receiving the frequency $f1$. The amplifier 26 is preferably a small transistorized circuit with a gain of approximately 200 to 1000 located near the receiver antenna 22 to avoid line losses in the comparatively weak signal developed in the antenna. In practice, I prefer to incorporate the amplifier 26 in a potted construction positioned around the support for the antenna 22. The high gain of the amplifier 26 provides adequate signal strength for coupling the amplifier output to the remotely located control box 10.

The synchronous detector 16 contains an integrating capacitor that is constantly being charged and bled off. The strength of the signal supplied to the transmitter plate driver 14 is adjusted so that when no conductive object is present between the antenna plates, the capacitor charge never reaches a sufficient level to trigger the relay driver 18. When such an object is present, however, the capacitive coupling between the antenna plates increases and this causes a corresponding increase in the output of the receiver amplifier 26. The increased receiver amplifier output then charges the capacitor to a level which energizes the relay driver 18 which in turn actuates the door operator mechanism 24 to open the door 32. When the conductive object leaves the area, the output of amplifier 26 drops back to its steady state level, the relay driver is de-energized and the door closes.

Figure 2:
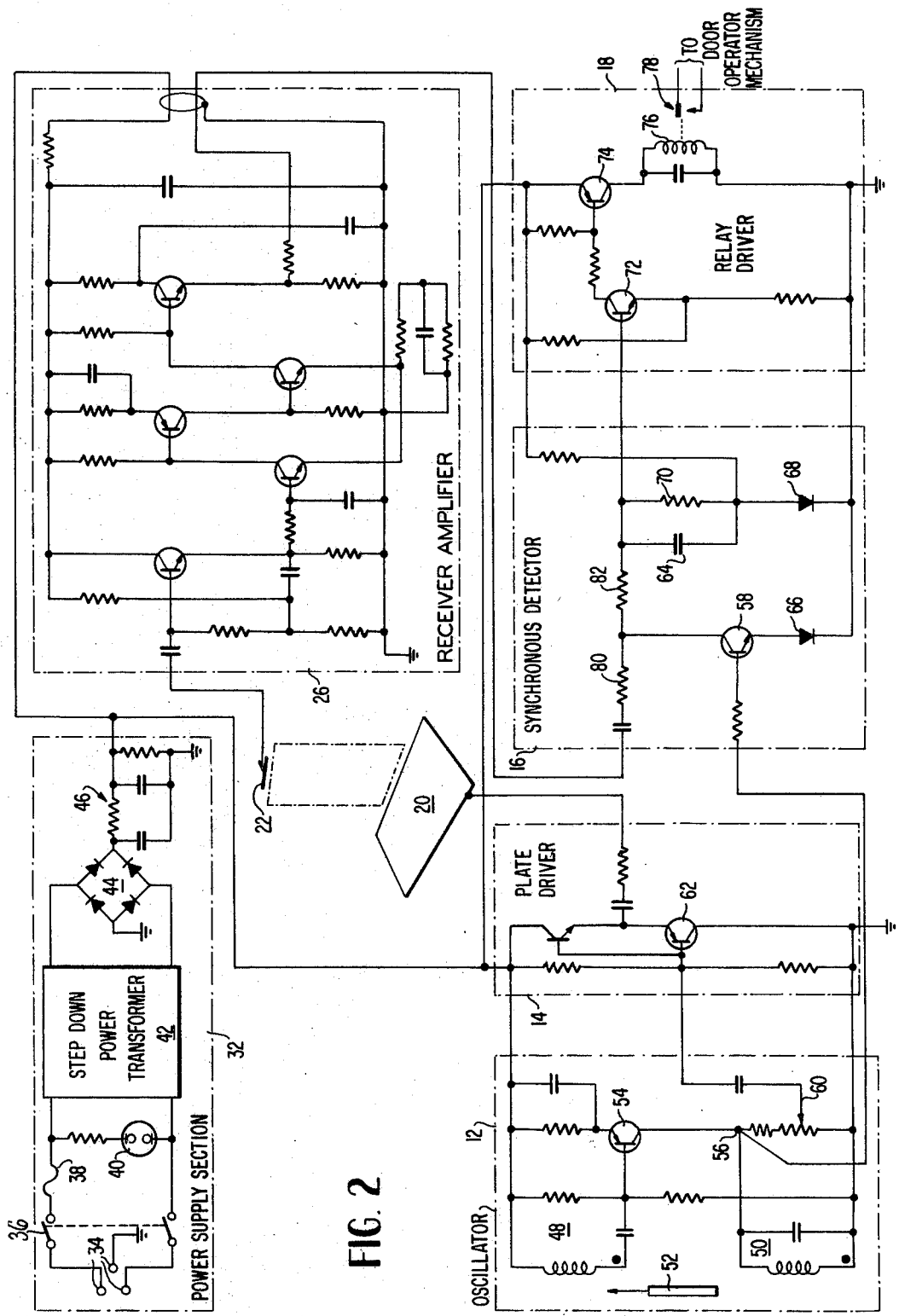
FIG. 2 shows a detailed schematic diagram of the electronic circuitry employed.

Turning now to the schematic diagram of FIG 2, the power supply section 32 includes line voltage input terminals 34, a double pole, double throw on-off switch 36, a fuse 38, a neon indicator lamp 40, a step-down power transformer 42, a full wave diode bridge rectifier 44, and a smoothing filter 46. Its 24 volt DC output is fed to the oscillator 12, the plate driver 14, the amplifier 26, the synchronous detector 16 and the relay driver 18.

The transistorized oscillator 12 may be of any suitable type and is shown as being comprised of LC circuits 48 and 50 whose frequency may be varied by adjusting the inductor core 52. A full strength output is taken from the collector terminal of transistor 54 at node point 56 and resistively coupled to the base of transistor 58 in the synchronous detector 16, while an attenuated output is taken from potentiometer 60 and coupled to the base of transistor 62 in the plate driver 14. The output of the latter is fed to the transmitter antenna plate 20. The signal propagated by the transmitter antenna is picked up by the receiver antenna 22 and coupled to the five stage transistor amplifier 26 of conventional design. The shielded output of amplifier 26 is supplied to the synchronous detector 16 as the second input thereto.

In the synchronous detector 16 positive half cycles of the input from amplifier 26 coincide with negative half cycles of the input from oscillator 12. This permits these positive signals to charge capacitor 64 since transistor 58 will be off or non-conductive. When the input from amplifier 26 is negative, the oscillator signal will be positive and transistor 58 will be on. If any spurious positive signals are generated in antenna 22 and amplifier 26 during this time, they will have no charging effect on capacitor 64 since they will be passed to ground through transistor 58 and diode 66. Diode 68 prevents capacitor 64 from discharging through transistor 58 or back through amplifier 26. Capacitor 64 is continuously being discharged through resistor 70 whose value is such that with a normal (no conductive object approaching the door opening) output from amplifier 26 the charge never reaches a sufficient level to render transistor 72 in the relay driver 18 conductive. When a person approaches the door opening, however, the coupling between the antenna plates increases and this results in an increased output from amplifier 26. The capacitor 64 now begins to charge at a faster rate than it can discharge through resistor 70, and when the charge reaches a sufficiently high level, transistor 72 is biased into conduction. This lowers the base potential of transistor 74 to render the latter conductive, which in turn energizes relay coil 76 to close its associated switch contacts 78. The switch contacts complete the final circuit and actuate the operator mechanism 28 to effect the desired opening of the door 30. If the door is formed of a conductive material, such as steel or aluminum, it should be grounded to prevent it from having a self-sustaining coupling effect between the antenna plates upon opening.

The charging of capacitor 64 to the necessary triggering level requires more than just a few cycles of increased output from amplifier 26, thereby preventing actuation by the momentary presence of a conductive object, such as by a person waving his arm over the transmitter plate 20. This integrating effect may be controlled by the appropriate selection of the parameters for capacitor 64 and resistors 70. 80 and 82. The sensitivity of the circuit may easily be varied by adjusting potentiometer 60 which in turn effects the steady state charge on capacitor 64. By proper adjustment, the circuit may be rendered sensitive to adults and children, but insensitive to small animals of lesser height.

As hereinbefore discussed, a separate but substantially identical oscillator 12, transmitter plate driver 14, synchronous detector 16, and relay driver 18 may be housed in the control box 10 for use with a second transmitter plate antenna 20 and receiver antenna 22 positioned on the opposite side of the doorway from those illustrated in FIG. 1. As will be apparent to those skilled in the art, such additional transmitter plate and receiver antennas may be used to render the door operator 4 automatically responsive to traffic approaching the door from the opposite direction or as a safety carpet to prevent injury if pedestrians approach the door from both sides as where door 2 is a swinging door.

Figure 3:
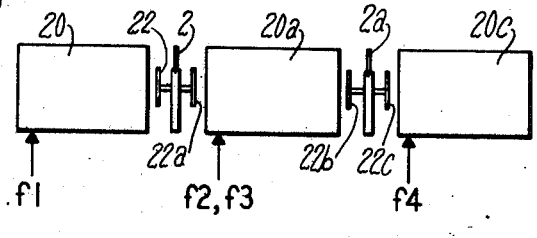
FIG. 3 is a schematic illustration of the invention applied to an entrance foyer having inner and outer doors with the transmitter plate between the doors driven at two different frequencies.

FIG. 3 illustrates schematically the application of the invention to an entrance foyer having inner and outer doors. The transmitter plate 20 and the associated receiver antenna 22 associated with door 2 automatically initiate the operation of the same as hereinafter described in connection with FIGS. 1 and 2. Also mounted on the header above door 2 is a second receiver antenna 22a which cooperates with transmitter plate 20a driven at a second frequency, f2, by a second oscillator which may be housed in control box 10 to initiate the operation of door 2 in response to traffic in the opposite direction.

Since the transmitter plate 20a is positioned in a foyer between two doors 2 and 2a, both of which are to be automatically opened for the passage of traffic, the transmitter plate 20a is also driven at another frequency, f3, for detection by a receiver antenna 22b mounted on the header above door 2a. A pedestrian standing on transmitter plate 20a will thus trigger the control circuits associated with receiver antennas 22a and 22b to actuate doors 2 and 2a. In this manner, the full dimensions of transmitter plate 20a may be utilized for controlling both the doors 2 and 2a of the foyer thus enabling the invention to be utilized where the doors 2 and 2a are spaced closely to each other while retaining the interdependent but selective operation of the doors.

Transmitter plate 20c of FIG. 3 is provided in association with door 2a and coacts with receiver antenna 22c in the manner described to actuate the door 2a only.

Figure 4:
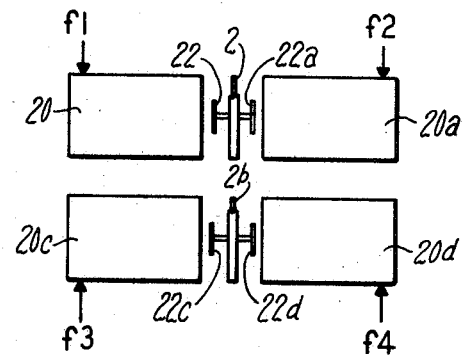
FIG. 4 is a another schematic illustration of the invention applied to a pair of side-by-side doors in which the system automatically regulates the traffic in opposite directions through the doorways, in parallel paths.

FIG. 4 schematically illustrates the invention as applied to a pair of side-by-side doors. In this application, the invention directs the traffic in parallel paths through the doorway as desired without the use of guide posts or rails. The side-by-side doors 2 and 2b each have an associated pair of transmitter plate and receiver antennas 20, 22, and 20a, 22a, respectively, positioned on opposite sides of the door. Similarly, door 2b has an associated pair of transmitter plate and receiver antennas 20c, 22c, and 20d, 22d, respectively on opposite sides thereof. Transmitter plate 20 is driven by a first frequency f1, and transmitter plates 20a, 20c and 20d are driven respectively at three other frequencies f2, f3 and f4 and are connected respectively with different oscillators, synchronous detectors, transmitter plate drivers, and relay drivers in the usual manner. It will thus be apparent that the door 2 will be responsive only to the signals detected by receiver antennas 22 and 22a and the door 2b will be responsive only to the signals detected by receiver antennas 22c and 22d. With any two diametrically opposed transmitter plates, say, 20a and 20c serving as safety carpets, it will be apparent that pedestrian or other traffic desiring to use the door must pass through door 2 from left to right and through door 2b from right to left.

Figure 5:
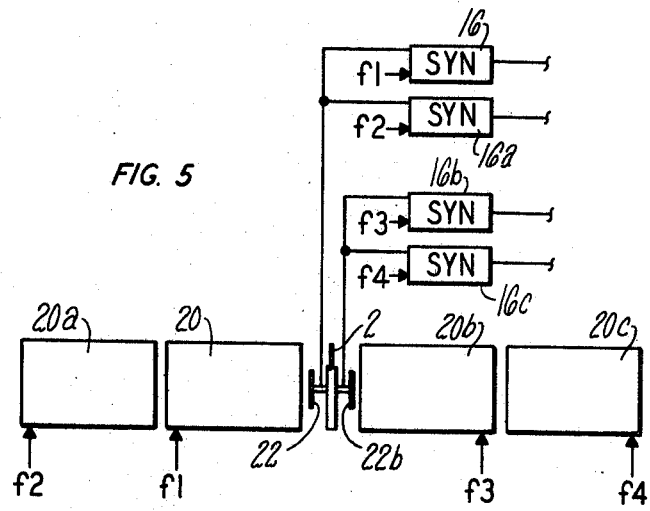
FIG. 5 is another schematic illustration of the invention wherein independent transmitter plates positioned in tandem along the path of traffic through a doorway control the operation of the door without a significant sacrifice of the sensitivity of the system.

FIG. 5 schematically illustrates the application of the invention to a door in which it is desired to initiate the operation of the door when the prospective user is further from the doorway without reducing the selectivity of the operator or increasing its sensitivity to false triggering. In this design a plurality of transmitter plates 20, 20a, shown as being two in number, are positioned in tandem at the approach of door 2. Transmitter plates 20 and 20a respectively are shown as cooperating with a single receiver antenna 22, the received signal of which is amplified and connected to one of the inputs of each of the two synchronous detectors 16, 16a. The other input of each of the synchronous detectors are connected to receive the input frequencies f1 and f2 which also are connected to drive transmitter plates 20, 20a respectively. The output of the synchronous detectors 16, 16a may be connected to control the door operating mechanism as previously discussed. With this tandem arrangement, the operation of the door 2 may be initiated in response to a pedestrian on the first transmitter plate 20a and continued in response to a pedestrian on transmitter plate 20. In a like manner, a pair of transmitter plates 20b and 20c may be driven at different frequencies f3 and f4, respectively and cooperate with receiver antenna 22b for controlling door 2.

From the foregoing it will be apparent that this invention provides a novel traffic responsive door control system which is unobtrusive and height sensitive and which is not subject to false triggering or susceptible to spurious signals. This is done by an arrangement which is adaptable to a wide range of power operators and doorway configurations without the use of posts and guard rails delineating specific traffic patterns through the doorway.

While the invention has been particularly shown and described with reference to the embodiments illustrated herein, it will be understood by those skilled in the art that various changes in form and details may be made therein without departing from the spirit and scope of the invention.

I claim:
1. A height sensitive door operator system, comprising:
   (a) means forming an electrically isolated transmitter antenna mounted on the floor spanning the traffic path approaching a doorway,
   (b) means forming an electrically isolated receiver antenna mounted by the header above the doorway,
   (c) means for energizing the transmitter antenna with an alternating current signal,
   (d) a door operator mechanism,
   (e) means coupled to the receiver antenna to sense an increase in a received electrical signal therefrom due to the presence of a conductive object, such as a person, between the antennas, and
   (f) means connecting said sensing means and said door operator mechanism to actuate said door operator mechanism in response to an increase in the received electrical signal.

2. A height sensitive door operator system as defined in claim 1 wherein the receiver antenna and the transmitter antenna are symmetrically disposed along the center line of the path of traffic through the doorway.

3. A height sensitive door operator system as defined in claim 2 wherein the transmitter antenna is approximately eight feet wide across the front of the doorway and extends outwardly therefrom approximately six feet.

4. A height sensitive door operator system as defined in claim 2 wherein the receiver antenna has a length in a direction parallel to the header of approximately two feet.

5. A height sensitive door operator system as defined in claim 1 wherein the sensing means includes a synchronous detector supplied with the received electrical signal from the receiver antenna and the alternating current signal from the energizing means.

6. A height sensitive door operator system as defined in claim 5 wherein the sensing means further includes signal integrating means for preventing the actuation of the door operator mechanism in response to the momentary presence of a conductive object between the antennas.

7. A height sensitive door operator system as recited in claim 1 wherein a plurality of transmitter antennas energized at different frequencies are disposed in tandem on one side of the doorway, and said sensing means is constructed to sense an increase in the received electrical signal at each frequency independently of the other frequency.

8. A height sensitvie door operator system as recited in claim 1 wherein said transmitter antenna is energized with alternating current signals at two different frequencies and is positioned between a pair of associated doors forming the doorway and said sensing means senses an increase in the received electrical signals resulting from each of said frequencies for controlling the passage of traffic through the doorway.

9. The height sensitive door operator system as recited in claim 1 wherein a pair of associated side-by-side doors form the doorway and the transmitter antenna means comprises a pair of substantially flat plates respectively mounted by the floor on opposite sides of the doorway in alignment respectively with one of said pair of doors, said plates being energized with alternating current signals at different frequencies and said sensing means separately senses an increase in the received electrical signals resulting from each of said frequencies for controlling the passages of traffic through the doorway and the operation of each of said doors.

10. A device as recited in claim 1 wherein the sensing means includes signal integrating means comprising a capacitor having a continuous discharge circuit and the discharge of the capacitor is a function of the received signal.

11. A device as recited in claim 1 wherein the transmitter antenna is a metal plate hermetically sealed and encapsulated in an insulating material.

12. A device as recited in claim 1 including a door which passes over said transmitter antenna upon opening, and means for grounding the door to prevent the door from producing a self-sustaining coupling effect between the antennas upon opening.

References Cited

UNITED STATES PATENTS

| | | | |
|---|---|---|---|
| 2,031,226 | 2/1936 | Parvin | 49—25 |
| 2,149,177 | 2/1939 | Miller | 49—25 |
| 2,695,977 | 11/1954 | Hupert et al. | 49—25 X |
| 2,895,728 | 7/1959 | Edelman | 49—25 |
| 3,041,507 | 6/1962 | Rose et al. | 49—25 X |
| 3,181,856 | 5/1965 | Dyben | 49—25 |
| 3,199,033 | 8/1965 | Atkins et al. | |
| 3,199,096 | 8/1965 | Bagno. | |
| 3,201,774 | 8/1965 | Uemura. | |
| 3,293,631 | 12/1966 | Premack | 340—258 |

DENNIS L. TAYLOR, Primary Examiner

U.S. Cl. X.R.

49—31; 340—258